(12) United States Patent
Kumagai et al.

(10) Patent No.: US 12,094,187 B2
(45) Date of Patent: Sep. 17, 2024

(54) IMAGE REACTION MAP GENERATION DEVICE, IMAGE REACTION MAP GENERATION METHOD, AND IMAGE REACTION MAP GENERATION PROGRAM

(71) Applicant: NIPPON TELEGRAPH AND TELEPHONE CORPORATION, Tokyo (JP)

(72) Inventors: Kaori Kumagai, Tokyo (JP); Jun Shimamura, Tokyo (JP); Atsushi Sagata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 338 days.

(21) Appl. No.: 17/619,208

(22) PCT Filed: Jun. 17, 2019

(86) PCT No.: PCT/JP2019/023972
§ 371 (c)(1),
(2) Date: Dec. 14, 2021

(87) PCT Pub. No.: WO2020/255223
PCT Pub. Date: Dec. 24, 2020

(65) Prior Publication Data
US 2022/0245927 A1    Aug. 4, 2022

(51) Int. Cl.
| | |
|---|---|
| G06V 10/762 | (2022.01) |
| G06V 10/22 | (2022.01) |
| G06V 10/764 | (2022.01) |
| G06V 10/77 | (2022.01) |
| G06V 10/82 | (2022.01) |

(52) U.S. Cl.
CPC .......... *G06V 10/7715* (2022.01); *G06V 10/22* (2022.01); *G06V 10/762* (2022.01); *G06V 10/764* (2022.01); *G06V 10/82* (2022.01)

(58) Field of Classification Search
CPC .... G06V 10/454; G06V 10/776; G06V 10/94; G06V 10/764; G06V 10/82;
(Continued)

(56) References Cited

U.S. PATENT DOCUMENTS

| | | | |
|---|---|---|---|
| 10,282,864 B1* | 5/2019 | Kim | ........................ G06T 9/002 |
| 2018/0307783 A1* | 10/2018 | Hah | ........................ G06F 30/327 |

(Continued)

FOREIGN PATENT DOCUMENTS

JP    2014067174 A    4/2014

OTHER PUBLICATIONS

Zhou et al., Interpretable Basis Decomposition for Visual Explanation, Proceedings of the European Conference on Computer Vision (ECCV), 2018, pp. 119-134, furnished via IDS.*
(Continued)

*Primary Examiner* — Guillermo M Rivera-Martinez

(57) ABSTRACT

An identification result explanation device calculates, for each of feature maps output individually from a plurality of filters used in specified layers of a CNN, a weight representing a degree of association with a result of identification for an input image by the CNN. The identification result explanation device outputs transposed feature maps obtained by transposing, for each of clusters, the feature maps in the cluster based on a result of classification of each of the feature maps for the input image classified into any of the clusters and on the weight calculated for each of the feature maps. The identification result explanation device uses the transposed feature maps in each of the clusters to retrieve, in a storage unit, each of the clusters including the feature maps linked to the same filters as those linked to the transposed feature maps for the input image and selects.

12 Claims, 4 Drawing Sheets

(58) Field of Classification Search
CPC .... G06V 10/7715; G06V 40/172; G06T 7/00; G06T 2207/20084
See application file for complete search history.

(56) References Cited

U.S. PATENT DOCUMENTS

| | | | |
|---|---|---|---|
| 2019/0147369 A1* | 5/2019 | Gupta | G06N 3/126 706/12 |
| 2019/0214024 A1* | 7/2019 | Gruber | G06F 16/2457 |
| 2019/0244122 A1* | 8/2019 | Li | G06N 5/022 |

OTHER PUBLICATIONS

Selvaraju et al., "Grad-CAM: Visual Explanations from Deep Networks via Gradient-Based Localization," 2017 IEEE International Conference on Computer Vision (ICCV), Venice, Italy, 2017, pp. 618-626, doi: 10.1109/ICCV.2017.74, furnished via IDS.*
Ribeiro et al. "Why Should I Trust You?": Explaining the Predictions of Any Classifier, 2016, pp. 1-10, arXiv:1602.04938v3.*
Csurka et al. (2004) "Visual Categorization with Bags of Keypoints" in Pro. Of ECCV Workshop on Statistical Learning in Computer Vision.
He et al. (2016) "Deep Residual Learning for Image Recognition" Proc. Conference on Computer Vision and Pattern Recognition(CVPR), pp. 770-778.
Selvaraju et al. (2016) Grad-CAM: Why did you say that? Visual Explanations from Deep Networks via Gradient-based Localization, literature, Oct. 7, 2016.
Zhou et al. (2018) "Interpretable Basis Decomposition for Visual Explanation" in Pro. Of European Conference on Computer Vision (ECCV), Sep. 8, 2018.

* cited by examiner

IMAGE REACTION MAP GENERATION DEVICE, IMAGE REACTION MAP GENERATION METHOD, AND IMAGE REACTION MAP GENERATION PROGRAM

CROSS-REFERENCE TO RELATED APPLICATIONS

This application is a U.S. National Stage Application filed under 35 U.S.C. § 371 claiming priority to International Patent Application No. PCT/JP2019/023972, filed on 17 Jun. 2019, the disclosure of which is hereby incorporated herein by reference in its entirety.

TECHNICAL FIELD

The disclosed technology relates to an identification result explanation device, an identification result explanation method, and an identification result explanation program.

BACKGROUND ART

In recent years, the prevalence of digital cameras and smartphones allows images to be easily acquired, and there is a growing demand to mechanically identify objects observed in these images. In various scenes such as, e.g., substitution for human visual inspection in a factory and automated detection of missing goods at a retail shop, an image identification technology which substitutes for or assists human eyes is anticipated.

With regard to the image identification technology, various techniques have conventionally been disclosed. For example, in NPL 1, a method based on SIFT (Scale Invariant Feature Transform) is disclosed. The method in NPL 1 uses a technique which causes a computer to learn a relationship between features of an image including an object having a known name and the name to classify an input image (query image) newly input thereto. The computer detects extremely small regions referred to as feature points from each of images and calculates a SIFT feature value for each of the feature points. The SIFT feature value is quantized to a code referred to as Visual Word, and each of the images is represented by a histogram of an appearance frequency of the Visual Word. The computer is caused to learn the obtained histogram as a feature value of the image. The computer can identify an unknown input image using the learned technique.

Likewise, a technique disclosed in PTL 1 cuts out partial images included in an image and including specific patterns and calculates feature values of these partial images. In the same manner as in NPL 1, a correspondence between a histogram generated from the calculated feature values and the image allows a computer to identify an unknown query image by using a learned technique.

According to NPL 1, points which seem to be discriminative are detected in the input image, and the SIFT feature value is calculated for each of these feature points. Likewise, in PTL 1 also, the partial images including the specific patterns are cut out of the input image, and the feature value is calculated for each of the partial images. Accordingly, in these techniques, it is obvious which part of the image is to be captured, and the feature values described for the input are determined in advance.

As a result, when a result of the identification of the image is obtained, it is possible to use the features captured in the image to analyze factors leading to the identification result.

Meanwhile, a large number of methods each based on Convolutional Neural Network (CNN), such as that disclosed in NPL 2, are disclosed.

The CNN repeatedly performs convolutional processing of outputting feature maps produced by applying filters that detect features to an input image, while sliding the filters thereover, and pooling processing of summing up the extracted features for each of local regions. The CNN learns the filters that detect the features in accordance with data, enhances robustness of the features detected by the pooling processing with respect to positions, and can deliver high identification performance.

Since each of the filters is automatically learned so as to allow the image to be finally identified more accurately, a feature representation of the image depends on training data.

As a result, a problem arises in that, when a result of the identification of the image is obtained, features captured by the CNN cannot be used directly to analyze the factors leading to the identification result. For example, when an error occurs in the identification result, it is difficult to analyze a cause of the error. This presents a major barrier to practical applications of an image identification technology based on the CNN.

As solutions to the problem described above, several techniques which describe factors leading to a result of identification by the CNN have been disclosed.

For example, a technique for clearly visualizing a portion to which the CNN finally paid attention in an image is disclosed (NPL 3). In NPL 3, a gradient representing a degree of influence on an identification result is obtained for a final-layer feature map, a value of the gradient is used as a weight, and a linear sum with the final-layer feature map is obtained to determine a portion attracting attention in a final layer. On obtaining a result of identification of a given image, a user can recognize the portion to which the attention was finally paid from the portion attracting attention.

Also, a technique which presents features captured by the CNN for each of regions in an image by using about 1000 types of concept labels determined in advance is disclosed (NPL 4). In NPL 4, CNN feature maps are decomposed into the concept labels, and a degree of contribution of each of the concept labels to a final output is quantized.

CITATION LIST

Patent Literature

[PTL 1] Japanese Patent Application Publication No. 2014-67174

Non-Patent Literatures

[NPL 1] G. Csurka, C. R. Dance, L. Fan, J. Willamowski and C. Bray. "Visual categorization with bags of keypoints" in Pro. Of ECCV Workshop on Statistical Learning in Computer Vision, 2004, pp. 59-74.
[NPL 2] K. He, X. Zhang, S. Ren, and J. Sun. "Deep residual learning for image recognition." In Proc. IEEE Conference on Computer Vision and Pattern Recognition (CVPR), 2016, pp. 770-778.
[NPL 3] R. R. Selvaraju, A. Das, R. Vedantam, M. Cogswell, D. Parikh and D. Batra. "Grad-CAM: Why did you say that? Visual Explanations from Deep Networks via Gradient-based Localization" arXiv: 1610.02391, 2016

[NPL 4] Z. Bolei, S. Yiyou, B. David, T. Antonio. "Interpretable Basis Decomposition for Visual Explanation" in Pro. Of European Conference on Computer Vision (ECCV), 2018.

SUMMARY OF THE INVENTION

Technical Problem

In NPL 3, it is possible to present a place to which the CNN finally paid attention. However, this method provides only a region closely related to the final output to the user, but does not clearly show the features captured by the CNN in the image. Consequently, the features captured by the CNN in the image cannot be used to analyze factors leading to an identification result.

Meanwhile, in NPL 4, it is possible to represent each of the regions of the image resulting from identification by the CNN and concept labels in which the types of features reacted by each of the region are defined in advance. Accordingly, it is possible to present an explanation which allows the features captured by the CNN in the image to be interpreted. However, a problem arises in that a method for the explanation of the captured features is limited by the number of the concept labels. For example, with regard to an image in which various sofas are observed, when there is a concept label of a sofa, reactions to the sofas can be explained. However, it is impossible to explain subtle differences between captured features such as, e.g., features of materials (fluffy or slippery materials) of the sofas or features of shapes (rounded or angular shapes) thereof. In addition, it is unrealistic to define and prepare all the various features captured by the CNN as the concept labels.

The disclosed technology is developed in view of the point described above, and an object thereof is to provide an identification result explanation device, an identification result explanation method, and an identification result explanation program which allow detailed features in an identification result to be explained.

Means for Solving the Problem

A first aspect of the present disclosure is an identification result explanation device including: a feature map calculation unit that calculates, when an input image is input to a CNN (Convolutional Neural Network), each of feature maps output individually from a plurality of filters used in specified layers of the CNN; a clustering unit that classifies each of the feature maps calculated individually for the plurality of filters into any one or more of a plurality of clusters based on a value of the feature map; a weight calculation unit that calculates, for each of the feature maps, a weight representing a degree of association with a result of identification for the input image by the CNN; an input image sorting unit that outputs each of transposed feature maps obtained by transposing, for each of the clusters, the feature maps in the cluster based on a result of the classification of each of the feature maps for the input image classified into any of the clusters and on the weight calculated for each of the feature maps; a retrieval unit that uses the transposed feature maps in each of the clusters to retrieve, in a storage unit, each of the clusters including the feature maps linked to the same filters as those linked to the transposed feature maps for the input image and selects, in the storage unit, each of the feature maps belonging to each of the retrieved clusters and one or more stored images linked to each of the retrieved clusters; and an output unit that produces, for each of the clusters for the input image, an input image reaction region map based on the transposed feature maps and the weights each for the input image and produces, for each of the retrieved clusters, stored image reaction region maps for the one or more selected stored images from the feature maps belonging to the clusters linked to the stored images.

A second aspect of the present disclosure is an identification result explanation method including the computer-implemented steps of: calculating, when an input image is input to a CNN (Convolutional Neural Network), each of feature maps output individually from a plurality of filters used in specified layers of the CNN; classifying each of the feature maps calculated individually for the plurality of filters into any one or more of a plurality of clusters based on a value of the feature map; calculating, for each of the feature maps, a weight representing a degree of association with a result of identification for the input image by the CNN; outputting each of transposed feature maps obtained by transposing, for each of the clusters, the feature maps in the cluster based on a result of the classification of each of the feature maps for the input image classified into any of the clusters and on the weight calculated for each of the feature maps; using the transposed feature maps in each of the clusters to retrieve, in a storage unit, each of the clusters including the feature maps linked to the same filters as those linked to the transposed feature maps for the input image and selecting, in the storage unit, each of the feature maps belonging to each of the retrieved clusters and one or more stored images linked to each of the retrieved clusters; and producing, for each of the clusters for the input image, an input image reaction region map based on the transposed feature maps and the weights each for the input image and producing, for each of the retrieved clusters, stored image reaction region maps for the one or more selected stored images from the feature maps belonging to the clusters linked to the stored images.

A third aspect of the present invention is an identification result explanation program for causing a computer to implement the same steps as included in the identification result explanation method according to the second aspect described above.

Effects of the Invention

The disclosed technology allows detailed features in an identification result to be explained.

DESCRIPTION OF EMBODIMENTS

Figure 1:
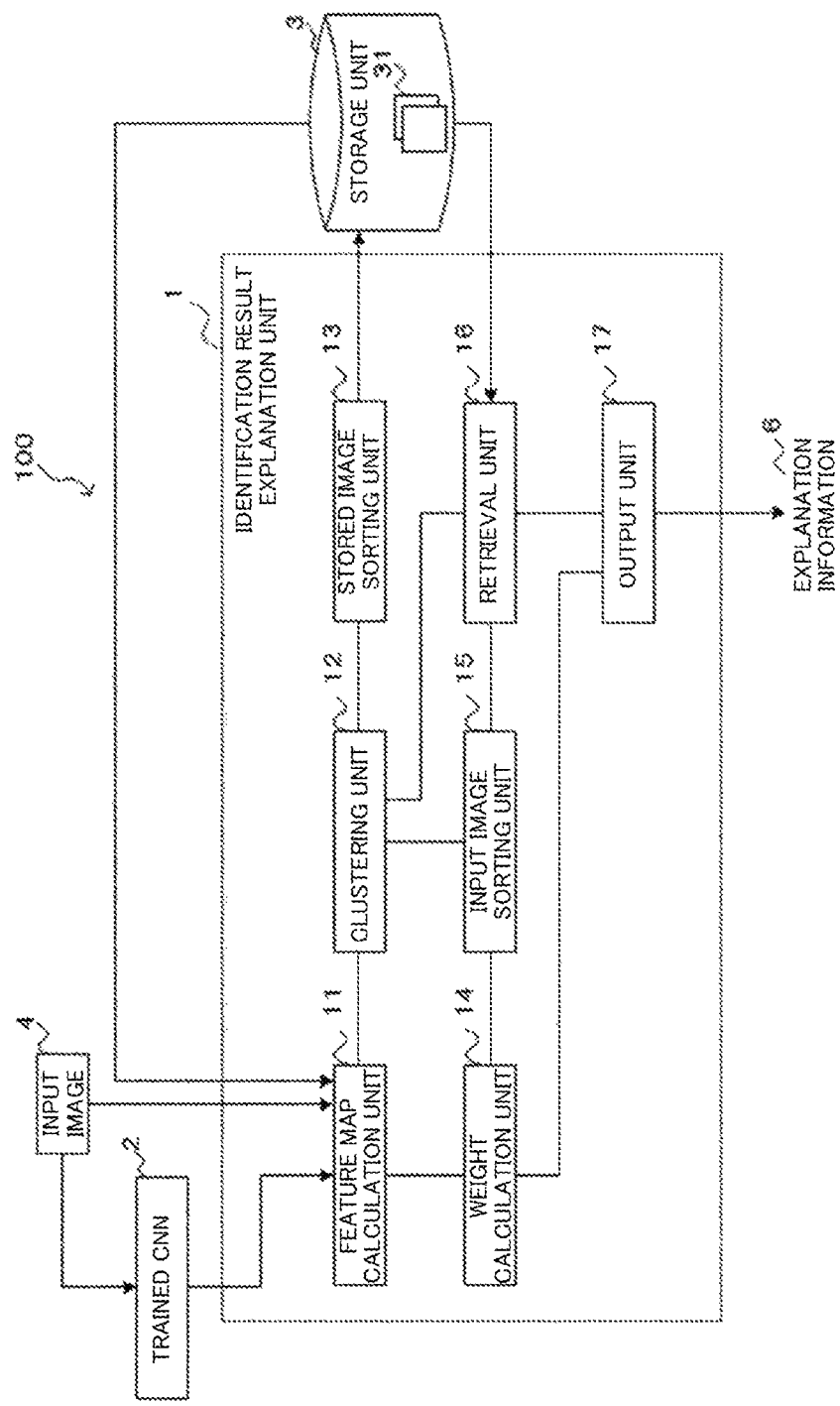
FIG. 1 is a block diagram illustrating a configuration of an identification result explanation device in the present embodiment.

Referring to the drawings, an example of an embodiment of the disclosed technology will be described. Note that, throughout the drawings, the same reference numerals are given to the same or equivalent components and parts. In addition, the dimensional ratios in the drawings are exaggerated for convenience of description and may differ from the real ratios.

A description will be given of a configuration of the present embodiment.

FIG. 1 is a block diagram illustrating a configuration of an identification result explanation device in the present embodiment.

As illustrated in FIG. 1, an identification result explanation device 100 is configured to include an identification result explanation unit 1, a trained CNN 2, and a storage unit 3. The identification result explanation unit 1 is configured to include a feature map calculation unit 11, a clustering unit 12, a stored image sorting unit 13, a weight calculation unit 14, an input image sorting unit 15, a retrieval unit 16, and an output unit 17.

Figure 2:
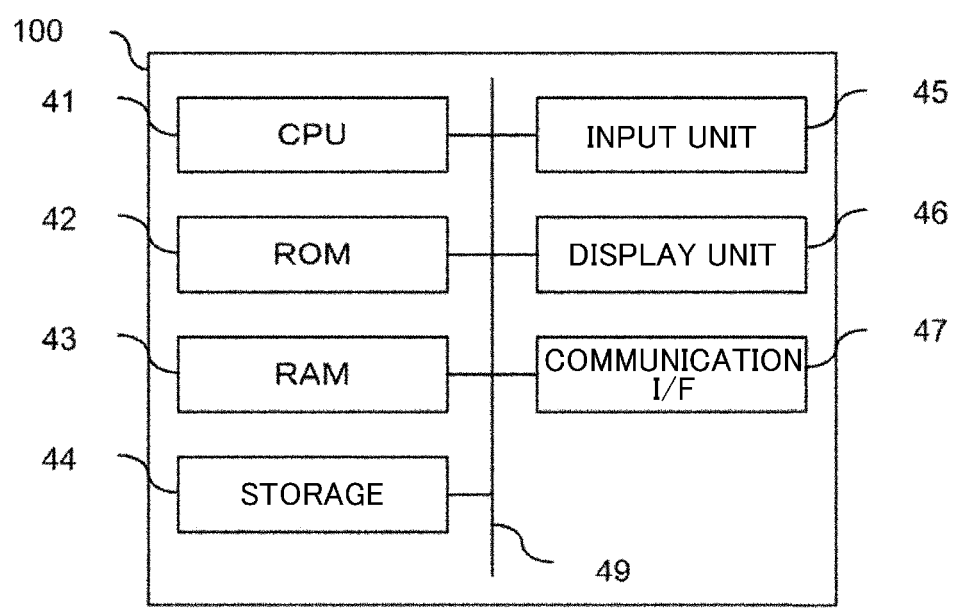
FIG. 2 is a block diagram illustrating a hardware configuration of the identification result explanation device.

FIG. 2 is a block diagram illustrating a hardware configuration of the identification result explanation device 100.

As illustrated in FIG. 2, the identification result explanation device 100 includes a CPU (Central Processing Unit) 41, a ROM (Read Only Memory) 42, a RAM (Random Access Memory) 13, a storage 44, an input unit 45, a display unit 46, and a communication interface (I/F) 47. The individual components are communicatively connected to each other via a bus 49.

The CPU 41 is a central processing unit which executes various programs and controls each of the units. In other words, the CPU 41 reads a program from the ROM 42 or the storage 44 and executes the program by using the RAM 43 as a workspace. The CPU 41 performs control of each of the components mentioned above and various arithmetic processing based on the program stored in the ROM 42 or the storage 44. In the present embodiment, in the ROM 42 or the storage 44, an identification result explanation program is stored.

The ROM 42 stores the various programs and various data. The RAM 43 temporarily stores, as the workspace, the programs or data. The storage 44 includes a HDD (Hard Disk Drive) or an SSD (Solid State Drive) and stores various programs including an operating system and the various data.

The input unit 45 includes a pointing device such as a mouse and a keyboard, and is used to perform various input operations.

The display unit 46 is, e.g., a liquid crystal display and displays various information. The display unit 46 may also function as the input unit 45 by using a touch panel method.

The communication interface 47 is an interface for communicating with another device such as a terminal and uses, e.g., standards of the Ethernet (registered trademark), an FDDI, the Wi-Fi (registered trademark), or the like.

Next, a description will be given of individual functional configurations of the identification result explanation device 100. Each of the functional configurations is implemented by the CPU 41 by reading the identification result explanation program stored in the ROM 42 or the storage 44, deploying the identification result explanation program into the RAM 43, and executing the identification result explanation program.

The trained CNN 2 is a CNN having any given network structure for identifying an object present in an image. The trained CNN 2 stores, e.g., Deep Residual Network proposed in NPL 2 as a trained CNN model. The CNN model mentioned herein is a model having a network structure of a neural network which repeatedly performs a combination of convolutional processing and pooling processing and trained parameter information. The trained CNN 2 has been trained by using an image set corresponding to a set of images. To each of the images in an image set 31, a ground truth label used during CNN training is given. The ground truth label is, e.g., a character string representing the object observed in the image. In addition, to each of files for the individual images in the image set 31, an identifier which allows each of the image files to be specified is given to allow any of the files to be referred to. For example, when the number of the stored image files is D, a natural number of not less than 1 and not more than D is given to each of the images.

Each of the images in the image set 31 is hereinafter referred to as each of stored images. Also, the trained CNN is referred to simply as the CNN.

In the storage unit 3, each of the stored images corresponding to the image set 31 and transposed feature maps for each of the stored images are stored. The transposed feature maps will be described later, and the transposed feature maps for each of the stored images are obtained through processing performed by the feature map calculation unit 11, the clustering unit 12, and the stored image sorting unit 13.

The identification result explanation unit 1 generates, when a result of identification of an input image 4 is output, explanation information 6 corresponding to explanation information for explaining where and what types of features the trained CNN 2 captured, i.e., the identification result. The input image 4 is a target image for which the identification result is to be explained.

The explanation information 6 includes a pair of the input image 4 and an input image reaction region map indicating a reaction region of the input image 4 and a pair of the stored images similar to the input image 4 and one or more stored image reaction region maps each indicating a reaction region of each of the stored images. The stored images similar to the input image 4 are stored images registered in the storage unit 3 and recognized by the CNN to be similar to the image region indicated by the input image reaction region map, which are selected by the retrieval unit 16.

In the input image reaction region map and the stored image reaction region maps, the number of channels is 1 or 3 and, when the number of the channels is 1, there are cases where a range of numerical values includes binary values represented by 0 or 1 or is represented by integers of not less than 0. When the range of numerical values includes the binary values, the input image reaction region map and the stored image reaction region maps are binary maps and, when the range of numerical values is represented by the integers of not less than 0, the input image reaction region map and the stored image reaction region maps are heat maps in which the numerical values are represented by density variations.

Next, a description will be given of the individual units of the identification result explanation unit 1.

First, a description will be given of preliminary processing related to each of the stored images. Note that details of processing by the feature map calculation unit 11 and the clustering unit 12 will be described later in the description of the identification result explanation processing.

The feature map calculation unit 11 calculates, when each of the stored image stored in the storage unit 3 is input to the CNN, each of the feature maps individually output from the plurality of filters used in specified layers of the CNN.

The clustering unit 12 classifies, based on a value of each of the feature maps calculated for each of the stored images, the feature map into one or more of a plurality of clusters.

The stored image sorting unit 13 outputs, for each of the clusters, each of the transposed feature maps based on a classification result for each of the feature maps calculated for each of the stored images and classified into any of the clusters and on a predetermined value of each of the feature maps. The transposed feature maps are feature maps obtained by transposing the individual feature maps classified into the cluster of concern. For example, the stored image sorting unit 13 performs, for each of K clusters to which the clustering unit 12 performs the classification, cluster-by-cluster transposition of feature maps $A^k_n(x)$ in ascending order based on stored image feature map scores determined based on predetermined values in feature maps $A_n(x)$. For the convenience of description of the preliminary processing, each of the stored images is denoted herein by x. The stored image sorting unit 13 outputs, to the storage unit 3, a pair of the image x and feature maps $A^{k,\,i}_n(x)$ transposed on a cluster-by-cluster basis, where i represents a numerical value representing an ordinal position in each of the clusters, which is a natural number of not less than 1. Each of the stored image feature map scores determined based on the values in the feature maps $A_n(x)$ may have any value as long as the value represents a strength of a reaction of the stored image x to a filter n. For example, as each of the predetermined values, a maximum value in the feature map $A_n(x)$ may be used or an average value of the values therein may also be used.

By the foregoing preliminary processing, in the storage unit 3, each of the stored images and the transposed feature maps for each of the storage images are stored.

Next, a description will be given of identification result explanation processing.

The feature map calculation unit 11 calculates, when the input image 4 is input to the CNN, each of the feature maps output individually from the plurality of filters used in the specified layers of the CNN. For the convenience of description of the identification result explanation processing, the input image 4 is denoted also by x herein. When the image x is input to the CNN, the feature map calculation unit 11 calculates the feature maps $A_n(x)$ output individually from the plurality of filters n and outputs a pair of the image x and the feature maps $A_n(x)$ to the clustering unit 12 and to the weight calculation unit 14. The filters n are an example of the specified layers.

Specifically, the feature map calculation unit 11 receives an input of the image x, while receiving the CNN model from the trained CNN2, and calculates the feature map $A_n(x)$ for each of the filters n in any given layer, e.g., the fifth layer when the image x is input to the CNN model. Additionally, to each of the feature maps $A_n(x)$, the filter n that has output the feature map $A_n(x)$ is linked.

The feature map $A_n(x)$ mentioned herein is a matrix, and assumedly has a size of h×w. For example, in a 4-layered res5c in Residual Network-152 in Reference 1, the number N of filters is 2,048, and 2,048 feature maps $A_n(x)$ can be obtained for each one image. A size of each of the feature maps $A_n(x)$ is 7×7.

The clustering unit 12 classifies, based on a value of each of the feature maps $A_n(x)$, the feature map calculated for each of the plurality of filters by the feature map calculation unit 11 into any of the plurality of clusters.

Specifically, the clustering unit 12 acquires N feature maps $A_n(x)$ each having the size of h×w from the feature map calculation unit 11 and performs clustering to classify each of the N feature maps $A_n(x)$ into any of the K clusters.

Note that h and w represent vertical and lateral dimensions of each of the feature maps $A_n(x)$, and N represents the number of filters in the layer of concern, which is defined by the CNN model to be used and by the layer. For example, in the 4-layered res5c in Residual Network-152 in Reference 1, h, w, and N are 7, 7, and 2,048, respectively. Also, K represents the number of the clusters, and whether or not it is necessary to set K in advance is determined by a clustering method to be used.

The clustering mentioned herein is processing for grouping, among the feature maps $A_n(x)$, the feature maps having regions having larger values the ranges of which are similar to each other. An example of a case where a kmeans method is used as a clustering method is shown herein. The number of the clusters is a parameter, and any given value is set thereto. It is assumed herein that, e.g., K=5 is satisfied. For each of the feature maps $A_n(x)$, a maximum element in the feature map $A_n(x)$ is extracted, coordinates of a position of the maximum element when coordinates of an upper left end of the feature map are assumed to be (0, 0) are determined, and the clustering is performed based on these coordinates. The clustering method need not be the kmeans method. For example, various clustering methods such as a shortest distance method or hierarchical clustering may also be used. Also, as a method of representing the region of each of the feature maps $A_n(x)$ having the larger value, the coordinates of the maximum value need not be used. For example, it may also be possible to use coordinates of three highest-order points. There is also another method in which each of the feature maps $A_n(x)$ is divided in advance into four regions, and the feature map $A_n(x)$ is classified depending on to which one of the four regions the maximum value of the feature map $A_n(x)$ belongs.

The foregoing is the description of the clustering method.

Then, the clustering unit 12 outputs, to the input image sorting unit 15, the pair of feature maps $A^k_n(x)$ of the individual filters classified into the K clusters and the input image x, where k represents the classification of the cluster.

The weight calculation unit 14 calculates, for each of the feature maps, a weight representing a degree of association with a result of the identification for the input image 4 by the CNN. Here, the weight calculation unit 14 calculates, for each of the feature maps $A_n(x)$ calculated by the feature map calculation unit 11, a weight $w^c_n$ representing a strength of association with an identification result c of the input image x by the CNN. Then, the weight calculation unit 14 outputs a set of the image x, the feature map $A_n(x)$, and the weight $w^c_n$ to the input image sorting unit 15 and to the retrieval unit 16.

The weight $w^c_n$ may have any value as long as the value represents a strength of association with a result of identification of each of the feature map $A_n(x)$. For example, it may also be possible to obtain a gradient representing a degree of influence of on the identification result c for the input image x, which is used in NPL 3, by using Expression (1) and use an obtained gradient $a^c_n$ as the weight $w^c_n$.

[Math. 1]

$$\alpha^c_n = \frac{1}{2}\sum_i \sum_j \frac{\partial y^c}{\partial A^n_{ij}} \quad (1)$$

Thus, a weight $w^c_n$ is calculated based on a value $A^{i,j}_n$ of the position of each of the feature maps, on an output value $y^c$ based on a probability of the identification result c output from the CNN, and on a value z determining the size of the feature map.

The input image sorting unit 15 outputs, for each of the clusters, the transposed feature maps $A^{k,\,i}{}_n(x)$ based on a result of the classification of each of the feature maps calculated for the input image x and classified into any of the clusters and on the weight $w^c{}_n$ calculated for each of the feature maps. The result of the classification is, (i.e., the feature maps $A^k{}_n(x)$. The transposed feature maps $A^{k,\,i}{}_n(x)$ are the feature maps $A^k{}_n(x)$ transposed in the cluster. The transposition is performed for each of the clusters by transposing, in ascending order, the feature maps $A^k{}_n(x)$ in the cluster based on the weights $w^c{}_n$ or on input image feature map scores determined based on the values in the feature maps $A_n(x)$ in addition to the values of the weights $w^c{}_n$. The input image sorting unit 15 outputs the input image x and the cluster-by-cluster transposed feature maps $A^{k,\,i}{}_n(x)$ to the retrieval unit 16. To summarize the feature maps, $A_n(x)$ denotes the original feature maps calculated from the CNN, $A^k{}_n(x)$ denotes the feature maps after being subjected to the clustering, and $A^{k,\,i}{}_n(x)$ denotes the transposed feature maps resulting from the transposition in each of the clusters. These are the feature maps each associated with the same filter n.

The input image sorting unit 15 determines, for the transposition, the input image feature map scores by multiplying the weights $w^c{}_n$ with respect to the identification result by the predetermined values in the feature maps $A_n(x)$. In the calculation of the input image feature map scores, each of the weights $w^c{}_n$ has a value representing the degree of association with the identification result c, and each of the predetermined values represents the strength of the reaction of the input image x to the filter n. As each of the predetermined values, e.g., a maximum value in the feature map $A_n(x)$ is used. As the input image feature map scores, only the weights $w^c{}_n$ may also be used simply.

The cluster-by-cluster transposed feature maps $A^{k,\,i}{}_n(x)$ to be output to the retrieval unit 16 may be or may not be reduced to predetermined highest-order numbers. For example, it is assumed that, when the predetermined number is 5, i in the cluster-by-cluster transposed feature maps $A^{k,\,i}{}_n(x)$ to be output to the retrieval unit 16 is a natural number of not less than 1 and not more than 5. Thus, the input image sorting unit 15 reduces, based on the input image feature map scores, the transposed feature maps to the feature maps having the highest-order input image feature map scores and outputs each of the feature map scores obtained as a result of the reduction. This omits the extra feature maps and can speed up the retrieval processing.

For the sake of description, the following will use x' to denote the stored image to distinguish the stored image from the input image x.

The retrieval unit 16 retrieves, in the storage unit 3, each of the clusters including the feature maps linked to the same filters as those linked to the transposed feature maps of the input image by using the transposed feature maps in the individual clusters. The retrieval unit 16 also selects, in the storage unit 3, each of the feature maps belonging to each of the retrieved clusters and one or more stored images linked to each of the retrieved clusters.

Specifically, the retrieval unit 16 retrieves, in the storage unit 3, a cluster k' to which transposed feature maps $A^{k',\,i'}{}_n(x')$ linked on a cluster-by-cluster basis to the same filters as the filters n linked to the transposed feature maps $A^{k,\,i}{}_n(x)$ in the cluster. Then, the retrieval unit 16 outputs the input image x and the feature maps $A^k{}_n(x)$ to the output unit 17. The retrieval unit 16 also selects the one or more stored images x' belonging to each of the retrieved clusters. Since there may conceivably be a case where the plurality of stored images x' are linked to one of the clusters, the plurality of stored images x' may be selected from one of the clusters. The retrieval unit 16 also selects the transposed feature maps $A^{k',\,i'}{}_n(x')$ belonging to each of the retrieved clusters. The retrieval unit 16 outputs the one or more stored images x' selected for each of the clusters and the transposed feature maps $A^{k',\,i'}{}_n(x')$ to the output unit 17.

A specific example of the retrieval will be described. For example, it is assumed that there are the cluster-by-cluster transposed feature maps $A^{k,\,i}{}_n(x)$ and i is a natural number of not less than 1 and not more than 3 for the input image x. The filters linked to the transposed feature maps $A^{k,\,i}{}_n(x)$ in the cluster k are assumed to be $n=n_1$ when i=1 is satisfied, $n=n_2$ when i=2 is satisfied, and $n=n_3$ when i=3 is satisfied. In this case, in the retrieval, the clusters to which feature maps $A^{k,\,i}{}_{n1}(x)$, $A^{k,\,i}{}_{n2}(x)$, and $A^{k,\,i}{}_{n3}(x)$ linked to the same filters as the filters $n_1$, $n_2$, and $n_3$ belong are retrieved in the storage unit 3. At this time, it may be possible to select only the clusters to which all the filters $n_1$, $n_2$, and $n_3$ belong or select only the clusters to which any of the filters, e.g., $n_1$ or $n_2$ belongs.

The output unit 17 produces, for each of the clusters for the input image x, the input image reaction region map based on the transposed feature maps and the weights each for the input image x. The output unit 17 also produces, for each of the retrieved clusters, the stored image reaction region maps for the one or more selected stored images x' from the feature maps belonging to the clusters linked to the stored images x'.

For example, the output unit 17 calculates, for the input image x, the input image reaction region map in accordance with Expression (2) shown below by using the feature maps $A^k{}_n(x)$ and the weights $w^c{}_n$.

[Math. 2]

$$\sum_n w^c_n \times A^k_n \qquad (2)$$

In addition, the output unit 17 calculates, for the stored images x', the stored image reaction region maps from feature maps $A^{k'}{}_n(x')$ in accordance with Expression (3) shown below.

[Math. 3]

$$\sum_{n'} A^{k'}_{n'} \qquad (3)$$

The output unit 17 outputs a pair of the input image x and the input image reaction region map for each of the clusters and pairs of the one or more stored images x' and the stored image reaction region maps for each of the retrieved clusters as the explanation information 6 for the result of the identification by the CNN.

Figure 3:
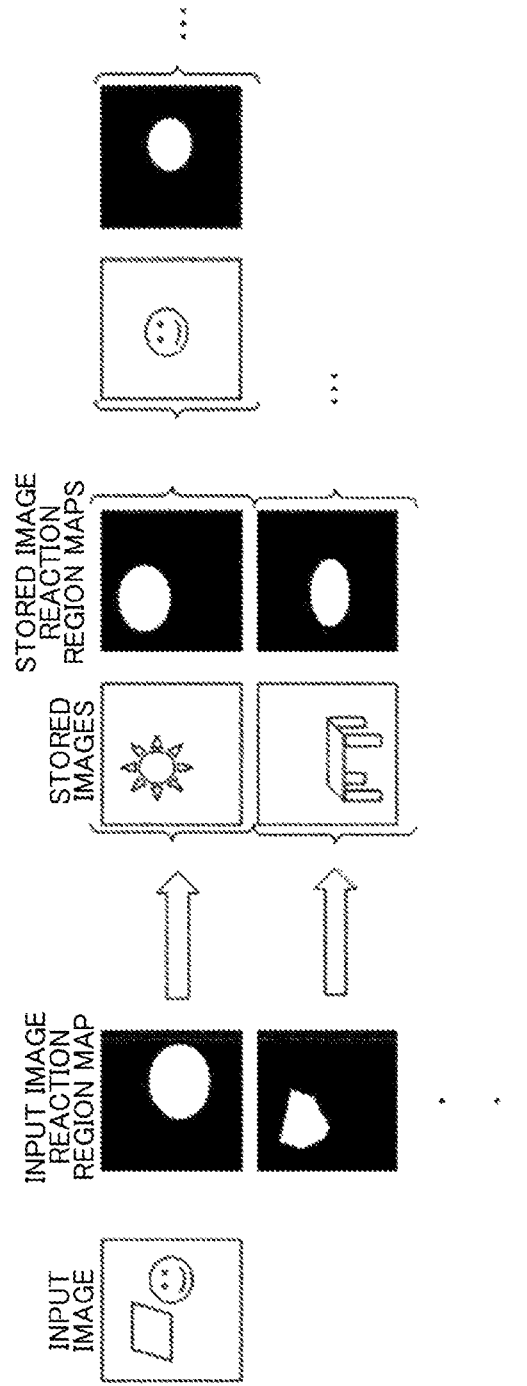
FIG. 3 is a conceptual diagram illustrating an example of explanation information.

FIG. 3 is a conceptual diagram illustrating an example of the explanation information.

Next, a description will be given of the operation of the identification result explanation device 100.

Figure 4:
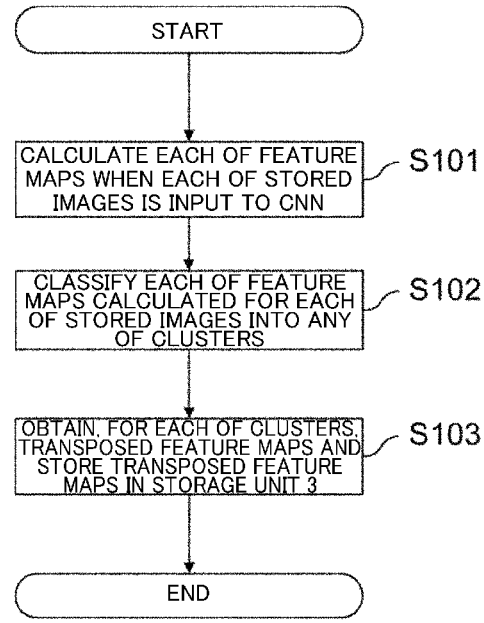
FIG. 4 is a flow chart illustrating a flow of preliminary processing by the identification result explanation device.

FIG. 4 is a flow chart illustrating a flow of preliminary processing by the identification result explanation device 100. The CPU 41 reads the identification result explanation program from the ROM 12 or the storage 44, deploys the identification result explanation program in the RAM 43, and executes the identification result explanation program to thereby perform the preliminary processing.

In Step S101, the CPU 41 calculates, when each of the stored images stored in the storage unit 3 is input to the CNN, each of the feature maps output individually from the plurality of filters used in the specified layers of the CNN.

In Step S102, the CPU 41 classifies each of the feature maps calculated for each of the stored images into any one or more of the plurality of clusters based on the value of the feature map.

In Step S103, the CPU 41 obtains, for each of the clusters, the transposed feature maps based on a result of the classification of each of the feature maps calculated for each of the stored images and classified into any of the clusters and on the predetermined value in each of the feature maps, and stores the transposed feature maps in the storage unit 3.

Figure 5:
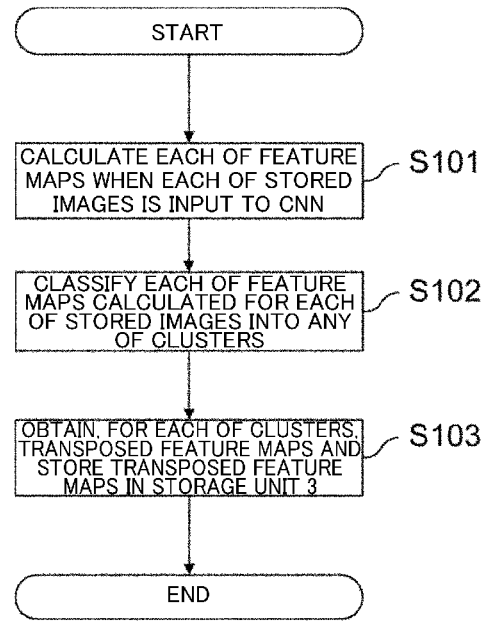
FIG. 5 is a flow chart illustrating a flow of identification result explanation processing by the identification result explanation device.

FIG. 5 is a flow chart illustrating a flow of the identification result explanation processing by the identification result explanation device 100. The CPU 41 reads the identification result explanation program from the ROM 42 or the storage 44, deploys the identification result explanation program in the RAM 43, and executes the identification result explanation program to thereby perform the identification result explanation processing.

In Step S201, the CPU 41 calculates, when the input image 4 is input to the CNN, $A_n(x)$ of each of the feature maps output individually from the plurality of filters used in the specified layers of the CNN.

In Step S202, the CPU 41 classifies each of the feature maps $A_n(x)$ calculated individually for the plurality of filters into any of the plurality of clusters based on the value of the feature map $A_n(x)$.

In Step S203, the CPU 41 calculates, for $A_n(x)$ of each of the feature maps, the weight $w^c_n$ representing the degree of association with the result of the identification for the input image 4 by the CNN.

In Step S204, the CPU 41 outputs, for each of the clusters, the transposed feature maps $A^{k,\,i}_n(x)$. The transposed feature maps $A^{k,\,i}_n(x)$ are the feature maps $A^k_n(x)$ transposed in the cluster. The transposed feature maps $A^{k,\,i}_n(x)$ are obtained through transposition based on the result ($A^k_n(x)$) of the classification of each of the feature maps calculated for the input image x and classified into any of the clusters and on the weight $w^c_n$ calculated for each of the feature maps.

In Step S205, the CPU 41 retrieves, in the storage unit 3, each of the clusters including the feature maps linked to the same filters as those linked to the transposed feature maps $A^{k,\,i}_n(x)$ for the input image x by using the transposed feature maps $A^{k,\,i}_n(x)$ in each of the clusters.

In Step S206, the CPU 41 selects, from the storage unit 3, each of the feature maps belonging to each of the retrieved clusters and the one or more stored images linked to each of the retrieved clusters.

In Step S207, the CPU 41 produces the input image reaction region map and the stored image reaction region maps. The input image reaction region map is produced, for each of the clusters for the input image x, based on the transposed feature maps and the weights each for the input image x. The stored image reaction region maps are produced, for each of the retrieved clusters, from the feature maps for the one or more selected stored images x' belonging to the clusters linked to the stored images x'.

In Step S208, the CPU 41 outputs a pair of the input image x and the input image reaction region map for each of the clusters and pairs of the one or more stored images x' and the stored image reaction region maps for each of the retrieved clusters as the explanation information 6 for the result of the identification by the CNN.

As described above, the identification result explanation device 100 in the present embodiment allows detailed features of the identification result to be explained.

Note that the embodiment described above has described a case where the input image sorting unit 15 transposes the feature maps for each of the clusters, but the processing is not limited thereto. Needless to say, even when, e.g., the input image sorting unit 15 performs no processing, it is possible to allow the retrieval unit 16 and the output unit 17 to perform processing by using the feature map $A^k_n(x)$ that can be identified by the cluster k and the filter n and explain detailed features of the identification result. Note that the same applies also to the processing by the stored image sorting unit 13 for the preliminary processing.

Note that it may also be possible that any of various processors other than the CPU performs the identification result explanation processing performed by the CPU by reading the software (program) in each of the embodiments described above. Examples of the processors to be used in this case include a dedicated electric circuit which is a processor having a circuit configuration designed exclusively to perform specified processing such as a PLD (Programmable Logic Device) having a circuit configuration that can be changed after the manufacturing thereof, such as FPGA (Field-Programmable Gate Array), or an ASIC (Application Specific Integrated Circuit). The identification result explanation processing may be performed by one of these various processors or by a combination (such as, e.g., a combination of the plurality of FPGAs or a combination of the CPU and the FPGA) of two or more processors of the same type or different types). More specifically, a hardware structure of each of these various processors is an electric circuit including a combination of circuit elements such as semiconductor elements.

Each of the embodiments described above has described the mode in which the identification result explanation program is stored (installed) in advance in the storage 44, but a mode of the program is not limited thereto. The program may also be provided in a mode in which the program is stored on a non-transitory storage medium such as CD-ROM (Compact Disk Read Only Memory), a DVD-ROM (Digital Versatile Disk Read Only Memory), or a USB (Universal Serial Bus) memory. Alternatively, the program may also be in a mode in which the program is downloaded from an external device via a network.

With regard to the foregoing embodiments, the following appendices will be further disclosed.

APPENDIX 1

An identification result explanation device comprising:
a memory; and
at least one processor connected to the memory,
the processor being configured to:
calculate, when an input image is input to a CNN, each of feature maps output individually from a plurality of filters used in specified layers of the CNN;
classify each of the feature maps calculated individually for the plurality of filters into any one or more of a plurality of clusters based on a value of the feature map;
calculate, for each of the feature maps, a weight representing a degree of association with a result of identification for the input image by the CNN;
output each of transposed feature maps obtained by transposing, for each of the clusters, the feature maps in the cluster based on a result of the classification of each of the feature maps for the input image classified into any of the clusters and on the weight calculated for each of the feature maps;

use the transposed feature maps in each of the clusters to retrieve, in a storage unit, each of the clusters including the feature maps linked to the same filters as those linked to the transposed feature maps for the input image and select, in the storage unit, each of the feature maps belonging to each of the retrieved clusters and one or more stored images linked to each of the retrieved clusters; and produce, for each of the clusters for the input image, an input image reaction region map based on the transposed feature maps and the weights each for the input image and produce, for each of the retrieved clusters, stored image reaction region maps for the one or more selected stored images from the feature maps belonging to the clusters linked to the stored images.

APPENDIX 2

A non-transitory storage medium storing thereon an identification result explanation program for causing a computer to execute the steps of:

calculating, when an input image is input to a CNN, each of feature maps output individually from a plurality of filters used in specified layers of the CNN;

classifying each of the feature maps calculated individually for the plurality of filters into any one or more of a plurality of clusters based on a value of the feature map;

calculating, for each of the feature maps, a weight representing a degree of association with a result of identification for the input image by the CNN;

outputting each of transposed feature maps obtained by transposing, for each of the clusters, the feature maps in the cluster based on a result of the classification of each of the feature maps for the input image classified into any of the clusters and on the weight calculated for each of the feature maps;

using the transposed feature maps in each of the clusters to retrieve, in a storage unit, each of the clusters including the feature maps linked to the same filters as those linked to the transposed feature maps for the input image and selecting, in the storage unit, each of the feature maps belonging to each of the retrieved clusters and one or more stored images linked to each of the retrieved clusters; and producing, for each of the clusters for the input image, an input image reaction region map based on the transposed feature maps and the weights each for the input image and producing, for each of the retrieved clusters, stored image reaction region maps for the one or more selected stored images from the feature maps belonging to the clusters linked to the stored images.

REFERENCE SIGNS LIST

1 Identification result explanation unit
2 Trained CNN
3 Storage unit
11 Feature map calculation unit
12 Clustering unit
13 Stored image sorting unit
14 Weight calculation unit
15 Input image sorting unit
16 Retrieval unit
17 Output unit
100 Identification result explanation device

The invention claimed is:

1. A system comprising circuitry configured to execute a method comprising:

calculating, when an input image is input to a (Convolutional Neural Network (CNN), each of feature maps output individually from a plurality of filters used in specified layers of the CNN, wherein the plurality of filters detects features of the input image;

classifying each of the feature maps calculated individually for the plurality of filters into any one or more of a plurality of clusters based on a value of the calculated each of the feature maps;

calculating, for each of the feature maps, a weight representing a degree of association with a result of identification for the input image by the CNN;

outputting each of transposed feature maps obtained by transposing, for each of the clusters, the feature maps in the cluster based on a result of the classification of each of the feature maps for the input image classified into any of the clusters and on the weight calculated for each of the feature maps;

retrieving, using the transposed feature maps in each of the clusters each of the clusters including the feature maps linked to the plurality of filters as those linked to the transposed feature maps for the input image;

selecting each of the feature maps belonging to each of the retrieved clusters and one or more stored images linked to the each of the retrieved clusters;

generating, for the each of the clusters for the input image, an input image reaction region map based on the transposed feature maps and the weights each for the input image; and generating, for the each of the retrieved clusters, stored image reaction region maps for the one or more selected stored images from the feature maps belonging to the clusters linked to the stored images.

2. The system according to claim 1, wherein the weight calculated for each of the feature maps is calculated based on a value of a position of the each of the feature maps calculated, on a score determined from a gradient of the feature map output from the CNN, and on a value determining a size of the feature map, and the input image sorting unit reduces the transposed feature maps to the highest-order feature maps based on input image feature map scores each obtained by multiplying a predetermined value in each of the feature maps by the weight and outputs each of the transposed feature maps obtained as a result of the reduction.

3. The system according to claim 1, further comprising:

calculating each of the feature maps for each of the stored images;

classifying each of the feature maps calculated for each of the stored images into any one or more of the plurality of clusters based on the value of the feature map;

obtaining the transposed feature maps by transposing, for each of the clusters, the individual feature maps for each of the stored images classified into the cluster based on a result of the classification of each of the feature maps classified into the cluster and on the predetermined value in each of the feature maps; and storing the transposed feature maps.

4. A computer-implemented method, the method comprising:

calculating, when an input image is input to a (Convolutional Neural Network (CNN), each of feature maps output individually from a plurality of filters used in specified layers of the CNN, wherein the plurality of filters detects features of the input image;

classifying each of the feature maps calculated individually for the plurality of filters into any one or more of a plurality of clusters based on a value of the calculated each of the feature maps;

calculating, for each of the feature maps, a weight representing a degree of association with a result of identification for the input image by the CNN;

outputting each of transposed feature maps obtained by transposing, for each of the clusters, the feature maps in the cluster based on a result of the classification of each of the feature maps for the input image classified into any of the clusters and on the weight calculated for each of the feature maps;

using the transposed feature maps in each of the clusters to retrieve, in a storage, each of the clusters including the feature maps linked to the plurality of filters as those linked to the transposed feature maps for the input image and selecting, in the storage, each of the feature maps belonging to each of the retrieved clusters and one or more stored images linked to each of the retrieved clusters; and producing, for each of the clusters for the input image, an input image reaction region map based on the transposed feature maps and the weights each for the input image and producing, for each of the retrieved clusters, stored image reaction region maps for the one or more selected stored images from the feature maps belonging to the retrieved clusters linked to the stored images.

5. The computer-implemented method according to claim 4, wherein
the weight calculated for each of the feature maps is calculated based on a value of a position of the each of the feature maps calculated, on a score determined from a gradient of the feature map output from the CNN, and on a value determining a size of the feature map; and
the transposed feature maps are reduced to the highest-order feature maps based on input image feature map scores each obtained by multiplying a predetermined value in each of the feature maps by the weight, and each of the transposed feature maps obtained as a result of the reduction is output.

6. The computer-implemented method according to claim 4, wherein
each of the feature maps is calculated for each of the stored images stored in the storage;
each of the feature maps calculated for each of the stored images is classified into any one or more of the plurality of clusters based on the value of the feature map; and
the transposed feature maps are obtained by transposing, for each of the clusters, the individual feature maps for each of the stored images classified into the cluster based on a result of the classification of each of the feature maps classified into the cluster and on the predetermined value in each of the feature maps, and the transposed feature maps are stored in the storage.

7. A computer-readable non-transitory medium storing computer-executable program instructions that when executed by a processor cause a computer system to execute a method comprising:
calculating, when an input image is input to a (Convolutional Neural Network (CNN), each of feature maps output individually from a plurality of filters used in specified layers of the CNN, wherein the plurality of filters detects features of the input image;

classifying each of the feature maps calculated individually for the plurality of filters into any one or more of a plurality of clusters based on a value of the each of the feature maps calculated;

calculating, for each of the feature maps, a weight representing a degree of association with a result of identification for the input image by the CNN;

outputting each of transposed feature maps obtained by transposing, for each of the clusters, the feature maps in the cluster based on a result of the classification of each of the feature maps for the input image classified into any of the clusters and on the weight calculated for each of the feature maps;

using the transposed feature maps in each of the clusters to retrieve, in a storage, each of the clusters including the feature maps linked to the plurality of filters as those linked to the transposed feature maps for the input image and selecting, in the storage, each of the feature maps belonging to each of the retrieved clusters and one or more stored images linked to each of the retrieved clusters; and producing, for each of the clusters for the input image, an input image reaction region map based on the transposed feature maps and the weights each for the input image and producing, for each of the retrieved clusters, stored image reaction region maps for the one or more selected stored images from the feature maps belonging to the retrieved clusters linked to the stored images.

8. The system according to claim 2, further comprising:
calculating each of the feature maps for each of the stored images;
classifying each of the feature maps calculated for each of the stored images into any one or more of the plurality of clusters based on the value of the feature map;
obtaining the transposed feature maps by transposing, for each of the clusters, the individual feature maps for each of the stored images classified into the cluster based on a result of the classification of each of the feature maps classified into the cluster and on the predetermined value in each of the feature maps; and
storing the transposed feature maps.

9. The computer-implemented method according to claim 5, wherein
each of the feature maps is calculated for each of the stored images stored in the storage;
each of the feature maps calculated for each of the stored images is classified into any one or more of the plurality of clusters based on the value of the feature map; and
the transposed feature maps are obtained by transposing, for each of the clusters, the individual feature maps for each of the stored images classified into the cluster based on a result of the classification of each of the feature maps classified into the cluster and on the predetermined value in each of the feature maps, and the transposed feature maps are stored in the storage.

10. The computer-readable non-transitory medium according to claim 7, wherein
the weight calculated for each of the feature maps is calculated based on a value of a position of the each of the feature maps calculated, on a score determined from a gradient of the feature map output from the CNN, and on a value determining a size of the feature map; and
the transposed feature maps are reduced to the highest-order feature maps based on input image feature map scores each obtained by multiplying a predetermined value in each of the feature maps by the weight, and each of the transposed feature maps obtained as a result of the reduction is output.

11. The computer-readable non-transitory medium according to claim 7, wherein
   each of the feature maps is calculated for each of the stored images stored in the storage;
   each of the feature maps calculated for each of the stored images is classified into any one or more of the plurality of clusters based on the value of the feature map; and
   the transposed feature maps are obtained by transposing, for each of the clusters, the individual feature maps for each of the stored images classified into the cluster based on a result of the classification of each of the feature maps classified into the cluster and on the predetermined value in each of the feature maps, and the transposed feature maps are stored in the storage.

12. The computer-readable non-transitory medium according to claim 10, wherein
   each of the feature maps is calculated for each of the stored images stored in the storage;
   each of the feature maps calculated for each of the stored images is classified into any one or more of the plurality of clusters based on the value of the feature map; and
   the transposed feature maps are obtained by transposing, for each of the clusters, the individual feature maps for each of the stored images classified into the cluster based on a result of the classification of each of the feature maps classified into the cluster and on the predetermined value in each of the feature maps, and the transposed feature maps are stored in the storage.

\* \* \* \* \*